United States Patent [19]

Kawahara

[11] 3,817,631
[45] June 18, 1974

[54] DEVICE FOR MEASURING DISTANCE OF OBJECTS FROM THE FORWARD END PORTION OF AN ENDOSCOPE

[75] Inventor: Ichizo Kawahara, Tokyo, Japan

[73] Assignee: Olympus Optical Co., Ltd., Tokyo, Japan

[22] Filed: June 2, 1972

[21] Appl. No.: 259,202

Related U.S. Application Data

[60] Continuation-in-part of Ser. No. 114,239, Feb. 10, 1971, abandoned, which is a division of Ser. No. 749,809, Aug. 2, 1968, Pat. No. 3,595,200.

[30] Foreign Application Priority Data

Aug. 8, 1967   Japan................................ 42-50508
Aug. 29, 1967  Japan................................ 42-73425
Aug. 8, 1967   Japan................................ 42-50507
Aug. 8, 1967   Japan................................ 42-50510

[52] U.S. Cl. ............................ 356/1, 356/9, 128/6
[51] Int. Cl. ......................... G01c 5/00, A61b 61/06
[58] Field of Search ......... 356/3, 8, 17, 21, 51, 1–9; 350/301; 128/6, 8

[56] References Cited
UNITED STATES PATENTS

| | | | |
|---|---|---|---|
| 1,172,306 | 2/1916 | Parker et al. | 350/301 |
| 3,096,756 | 7/1963 | Rosenfeld et al. | 356/237 |
| 3,224,320 | 12/1965 | Knudsen | 356/156 |
| 3,270,641 | 9/1966 | Gosselin | 128/4 |
| 3,329,059 | 7/1967 | McCormac | 356/241 |
| 3,493,774 | 2/1970 | Knudsen | 128/6 |
| 3,561,432 | 2/1971 | Yamaki et al. | 128/6 |

Primary Examiner—Ronald L. Wibert
Assistant Examiner—Paul K. Godwin
Attorney, Agent, or Firm—Kurt Kelman

[57] ABSTRACT

The invention disclosed provides a distance measuring device for measuring the distance of an object from the forward end portion of an endoscope adapted to be inserted into a hollow portion of a living body or the like for the inspection thereof. The forward end portion of the present device is connected to a control housing through an elongated tube. The image of an object received in the forward end portion by an objective lens system is transmitted through the elongated tube and viewed through an ocular means provided in the control housing. The distance between the object and the forward end portion of the endoscope is determined by using a pair of light beams having parallel rays emitted from the forward end portion of the endoscope toward the object so as to form light spots thereon.

The distance of the object from the forward end portion of the endoscope is determined by measuring the relative positions of the light spots with respect to the field of view of the endoscope. The direction of either one or both of the light beams are adjustable by a control mechanism in the control housing, with the amount of adjustment being indicative of the direction of the light beam. The distance between the object and the forward end portion is determined by bringing light spots appearing in the field of view into registration with each other.

5 Claims, 13 Drawing Figures

DEVICE FOR MEASURING DISTANCE OF OBJECTS FROM THE FORWARD END PORTION OF AN ENDOSCOPE

This application for U.S. Letters Pat. is a continuation-in-part of copending U.S. application Ser. No. 114,239, filed Feb. 10, 1971 now abandoned, which in turn is a divisional of U.S. application Ser. No. 749,809, filed Aug. 2, 1968, now U.S. Pat. No. 3,595,200, issued July 27, 1971. The present invention relates to a device for measuring the distance of an object from the forward end portion of an endoscope adapted to be inserted into a hollow portion of a living body or the like for the inspection thereof.

In using an endoscope, it is necessary to successively and intermittently observe an object such as a part of a hollow portion of a living body, in order to find out how the portion to be inspected changes with time. In comparing the results of an inspection with those obtained by the previous inspections, it is necessary to accurately find out the distance between the object and the forward end portion of the endoscope in order to exactly determine the actual dimension of the object so that correct judgement can be made on any variation in object size with time.

Heretofore, the amount of the adjustment of focus of the objective lens system of the endoscope for sharply focusing the object was by assuming the distance between the object and the forward end portion of the endoscope. However, since wide angle objective lens system having a relatively greater depth of focus are now being incorporated in endoscopes, the exact adjustment of the focus is very difficult to assume thereby lowering the accuracy of the inspection.

In another prior art method, a light beam having a predetermined intensity is emitted from the forward end portion of the endoscope so as to illuminate the object. The light reflected from the object is received by a sensing means provided in the forward end portion of the endoscope such that the intensity of the reflected light is converted into an electrical value from which the distance between the object and the forward end portion of the endoscope is estimated. However, the reliability of this method for determining distance is relatively low because the angle formed between the optical axis of the objective lens system, and the normal to the surface of the object tends to vary each time inspection is effected thereby resulting in a variation in the quantity of light received by the sensing means.

It has now been found that by practice of the present invention there is provided a device which overcomes many of the disadvantages of endoscopes of the prior art, and thus provides a novel and useful device for measuring the distance between the object and the forward end portion of the endoscope.

Generally, the present invention provides a novel and useful device for measuring the distance between an object and the forward end portion of an endoscope adapted to be inserted into a hollow portion of a living body or the like for the inspection thereof.

In principle, the present invention utilizes two beams of light, generally of condensed parallel rays, emitted from the forward end portion of the endoscope toward the object. The emitted light beams form bright light spots on the surface of the object which may be viewed through the endoscope together with the image of the object. The relative positions of the light spots with respect to the field of view thus provide means for measuring the distance to the object.

The distance between the object and the forward end portion of the endoscope may be determined on the basis of the relative positions of the light spots with respect to the field of view of the endoscope as measured by means of graduations arranged in the focal plane of the ocular means, or by means of a movable index mark arranged in the focal plane of the ocular means. The relative positions of the light spots may be controlled by a control mechanism provided in the control housing of the endoscope with means connecting to the light beam emitters, i.e., prisms, in the forward end portion of the endoscope. Preferably, an elongated tube of the device is included which is flexible and controlled by control means provided in the control housing.

The direction of either or both of the light beams may be controlled by operating a control mechanism provided relative the end near the control housing of the endoscope. When the direction of either or both of the light beams is changed, the positions of the light spots formed on the surface of the object are varied. Thus, when the two light spots are brought into registration with each other or into a predetermined relation with respect to the field of view, the distance between the object and the forward end portion of the endoscope is determined.

Other features of the present invention will become more apparent from the following detailed description of the present invention taken with reference to the accompanying drawings.

Figure 7:
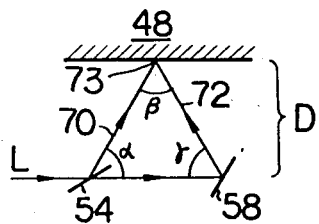
Figure 8:
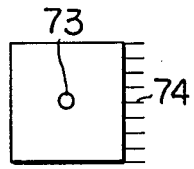
Figure 9:
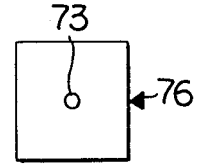
Figure 10:
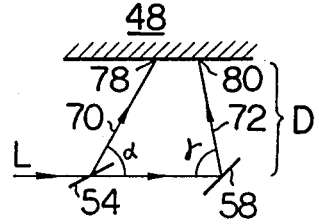
Figure 11:
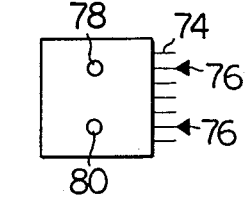
Figure 12:
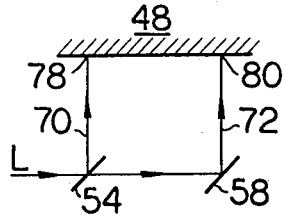
Figure 13:
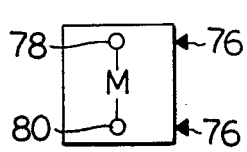

FIG. 7 diagrammatically illustrates how measurement of distance may be effected when light beams form one spot on the object;

FIG. 8 illustrates how registration of beams of FIG. 7 may appear through an ocular means;

FIG. 9 illustrates a variation of FIG. 8 including a separate indicator;

FIG. 10 illustrates how measurement of distance may be effected when light beams are non-parallel and form two light spots on the object;

FIG. 11 illustrates how registration of the light beams of FIG. 10 may appear through an ocular means;

FIG. 12 illustrates how measurement of distance may be effected when light beams are parallel and form two light spots on the object; and FIG. 13 illustrates how registration of the light beams of FIG. 12 may appear through an ocular means.

Figure 1:
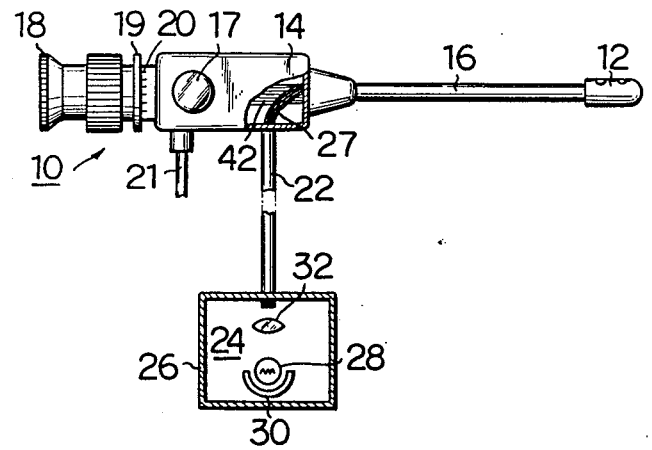
FIG. 1 is a side elevational view having parts taken in section illustrating an endoscope of the present invention.

Referring to the drawings, FIG. 1 illustrates device 10 for measuring the distance in accordance with the present invention. The endoscope shown comprises a forward end portion 12 connected to a control housing 14 by means of elongated tube 16, which is preferably an elongated flexible tube. Control housing 14 is provided with a focus adjusting means 17, an ocular means 18, a knurled knob 19, measuring graduations 20 and electric power supplying lead wires 21. Means (not shown) for effecting the bending of elongated tube 16 may be also advantageously included in the present device.

Flexible tube 22 through which light may pass such as by means of optical fibers or the like, may be detachably secured to housing 14 and provides conduit means for passing light from unit 24 to optical fibers 26. Light unit 24 may include casing 26, light source 28, light reflector 30, and light ray condenser 32 as desired.

Figure 2:
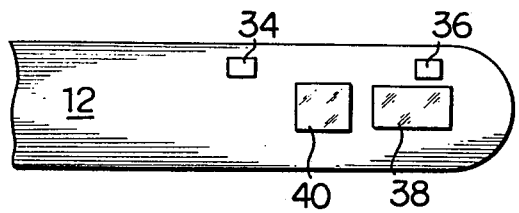
FIG. 2 is a partial view showing the top forward end portion of the endoscope of FIG. 1 as seen from the object being viewed.

FIG. 2 presents a partial top view of forward end portion 12 of the present endoscope. Light beams having parallel rays pass through windows 34 and 36 respectively, light from a suitable light source from portion 12 passes through illumination window 38, and viewing may be effected using viewing window 40.

Figure 3:
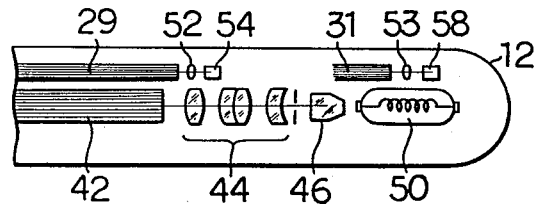
FIG. 3 is a fragmentary sectional view illustrating generally the internal portion of that forward end portion shown in FIG. 2.

FIG. 3 presents generally an example of arrangement of elements within the housing of the forward end portion 12 of the present endoscope.

As seen in FIG. 3, an image transmitting optical system 42, such as a fiber optical system by way of example, extends through an elongated tube 16 from the control housing 14, to the forward end portion 12 of the endoscope. An objective lens system 44 is provided in the forward end portion 12 in front of the forward end of the image transmitting optical system 42 in the optical axis thereof. A light reflecting means 46 such as a prism, is located in front of the objective lens system 44. Thus, light from an object 48, FIG. 6, passing through viewing window 40 is reflected by light reflecting means 46 toward and through the objective lens system 44 and to the forward end, in housing 14, of optical system 42 to form an image of the object which may be viewed through ocular means 18. The image formed on the forward end surface of the image transmitting optical system 42 is transmitted therethrough to the rearward end thereof, i.e., the end part within housing 14. The rearward end of the image transmitting optical system 42 is located in the control housing 14 in front of the ocular means 18, thereby permitting the thus transmitted image of the object to be viewed through the ocular means 18. Adjustment of the focusing of the objective lens system 44 can be effected by means of the focus adjusting means 17, if desired, or as indicated subsequently in FIG. 4.

A light source 50, such as a lamp or the like, is located in the forward end portion 12 and may be energized by an external power source through wires 21 extending from the control housing 14 through the elongated tube 16. Light source 50 may be replaced by a light conducting fiber optical system extending through the elongated tube 16 from the control housing 14 to the forward end portion 12. In this case, the rearward end of the light conducting fiber optical system adjacent to or in control housing 14 is illuminated by an external light source, i.e., simply light source 50 externally disposed, and the light transmitted through the light conducting fiber optical system to the forward end thereof is emitted therefrom toward the object by way of light illumination window 38.

Figure 4:
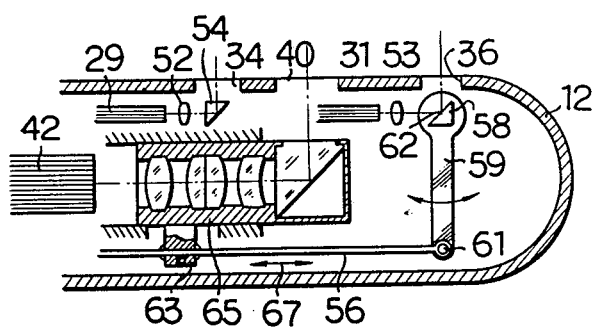
FIG. 4 is a fragmentary sectional view taken in side elevation illustrating generally the internal portion of the forward end of the endoscope for beam varying means and shiftable lens.

In accordance with one of the features of the present invention, a light projecting means for emitting a pair of light beams is provided in order to measure the distance between object 48 and the forward end portion 12 of the endoscope. The light projecting means comprises a first fiber optical system 29, a first collumating lens system 52, a light transparent prism 54, a second fiber optical system 31, a second collimating lens system 53, and a second light transparent prism 58 movable as indicated in FIG. 4. Prisms 54 and 58 are located obliquely in the optical axis of the collimating lens systems 52 and 53 respectively. Prism 58 is remotely spaced from prism 54 such that two light beams may be directed from prisms 54 and 58 toward object 48.

Fiber optical systems 29 and 31 extend from the control housing 14 through the elongated tube 16 to the forward end portion 12. Optical fibers 29 and 31 may receive light by fibers 27, or separate units 24 may be used for each optical fiber 29 and 31. In the latter case, light beams of different intensities may be realized. The rearward end of the fiber optical system 27 adjacent to or in the control housing 14 is illuminated by an external light source 24 such that the light is transmitted through the fiber optical system 27 to the forward end from which it is emitted. The light emitted from the forward end of the fiber optical systems 29 and 31 is collimated by the collimating lens system 52 and 53 respectively to form a fine light beam having parallel rays. One light beam is reflected from prism 54 toward the object 48 through a window 34 provided in the wall of the forward end portion 12, whereas a second light beam passing through prism 58 is reflected toward the object 48 through a window 36 provided in the wall of the forward end portion 12.

Thus, light beams having substantially parallel rays project to the object 48 from the light reflecting means 54 and 58 to form two small light spots on the surface of the object 48. These light spots may then be viewed through the viewing optical system comprising, viewing window 40, light reflecting means 46, objective lens system 44, image transmitting optical system 42 and ocular means 18, together with the field of view available by the objective lens system 44.

In one form of the present invention illustrated in FIG. 4, the direction of either one or both of the two light beams may be varied. Wire means 56, for example, may be included to vary the angle of prism 58 when disposed on support 59 pivotal about axis 62, and/or similar wire means may be included to similarly vary the light reflecting angle of prism 54 when supported on a similar pivotal axis. Wire means 56 is attached to the free end of support 59 at location 61 using suitable means as desired.

Wire means 56 may be connected to lever projection 63 joining shiftable lens barrel 65 by suitable means. Thus, objective lens system 44 and light reflecting means 46 supported within shiftable lens barrel 65 may be varied in direction of arrow 67 as the position of a light spot from prism 58 is varied on object 48. Obviously, shiftable lens barrel 65 is supported conveniently for movement by suitable surfaces within forward end portion 12, and the extent of viewing may be modified by extending the size and position of window 40. By appropriately selecting the length of support 59, light spot may coincide with a fixed point in the field of view during adjustment of slidable barrel 65. Compensating means such as cam means or the like may be interposed between wire 56 and support 59 thus to exactly correlate the pivotal movement of prism 58 with the relative position of barrel 65.

Figure 5:
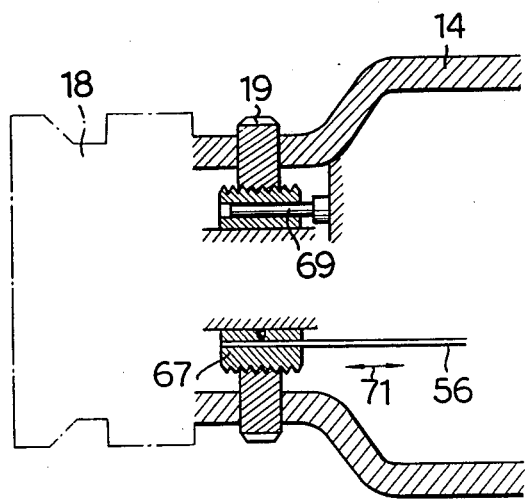
FIG. 5 is a fragmentary sectional view illustrating generally the internal portion of the means for varying the positions of the elements of FIG. 4.

FIG. 5 demonstrates means for moving either separately prism 54, prism 58, or shiftable lens barrel 65; or alternatively for movement of one or more combinations of these elements. Desirably, wire means 56 is disposed for moving both shiftable lens barrel 65, and prism 58 as illustrated in FIG. 4.

Knurled knob 19 is positioned for rotational operation near the ocular means 18 on housing 14. Wire means 56 is secured to axially moveable ring 67, held in non-rotating position by guide pin 59. Thus, rotation of knurled knob 19 by means of engaging gear teeth, causes ring 67 to move in the axial direction of arrow 71 thus similarly moving wire means 56 which may effect corresponding movement of shiftable lens barrel 65, and prism 58 such as indicated previously.

Figure 6:
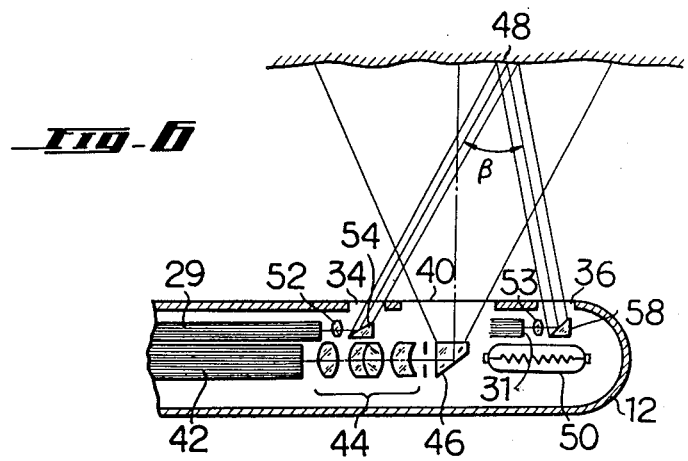
FIG. 6 is a fragmentary side sectional view of the forward end portion of the endoscope of FIG. 2 illustrating how distance may be measured.

In another form of the present invention illustrated in FIG. 6, the direction of each of the two light beams is fixed so that they are directed at known fixed angle to the object 48 within the field of view available by the objective lens system 44. FIG. 6 also presents an illustration of how measurement may be effected using the device of the present invention.

FIG. 7 diagrammatically presents elements of FIG. 6 exclusive of detail. Light beam L from collimating lens system 52 reflects as beam 70 from prism 54, whereas a similar beam from collimating lens system 53 reflects as beam 72 from prism 58. The light beams 70 and 72 may be positioned to cross each other at an angle $\beta$ at a certain distance from the forward end portion 12 and measurement D may thus be effected. Also, the angle $\beta$ may be made zero, i.e., the two light beams may be made parallel to each other in which case measurement is effected such as described subsequently.

The positions of the two light spots relative to each other with respect to the field of view of the endoscope as seen in the focal plane of the ocular means 18 vary as the distance D of the object from the forward end portion 12 varies when the angle $\beta$ is set to a fixed value. Therefore, the distance D between object 48 and the forward end portion 12 can be determined on the basis of the relative positions of the two light spots with respect to the field of view as seen in the focal plane of the ocular means 18, noting FIG. 8.

Graduations 74 are provided in the focal plane of the ocular means 18 as shown in FIG. 8. The location of the graduations 74 is so determined that it extends in the direction corresponding to the location of the plane including the optical axis extending from the light-reflecting mirrors to the object 48.

When the distance between the object 48 and the forward end portion 12 of the endoscope is varied, for example, then the position of the light spot formed by the light beams on the surface of the object 48 as viewed through the ocular means also varies with respect to the field of view available, thereby permitting the position of the light spot 73 to be read out by means of the graduations 74. Thus, the distance between object 48 and the forward end portion 12 can be determined by the medium of the graduations 74 provided in the focal plane of the ocular means 18 to serve as a light spot reference point for fixing distance D.

Alternatively, a movable index mark 76 of FIG. 9 may be provided in place of the graduations 74 so that the index mark 76 or the image thereof formed by a conventional optical system is moved in the focal plane of the ocular means 18 by means of a control knob provided on the control housing 14. The movement of the index mark 76 is controlled by the control knob so that the index mark 76 is brought into registration with the light spot as viewed in the focal plane of the ocular means 18. Thus, the distance of the object 48 from the forward end portion 12 is determined on the basis of the amount of the operation of the control knob for bringing the index mark 76 into registration with the light spot. To this end, an indicating means may be provided in the control housing which indicates the amount of movement of the control knob in terms of the distance of the object 48 from the forward end portion 12 of the endoscope.

Further illustrations of how present measurement may be effected using the present device are disclosed in parent application, now U.S. Pat. No. 3,595,220, the disclosure of which is incorporated herein by reference.

Thus, with reference to FIGS. 6-9, measurement of distance D may be effected as follows. Prisms 54 and 58 are fixed in position thereby fixing angles $\alpha$ and $\gamma$ respectively. When the beams of light 70 and 72 cross at the object 48, and when the resulting spot 73 appears at a pre-determined reference location using reference lines 74, by way of example, within the field of view, then the value D becomes known. This determination is thus based on simple mathematics.

FIGS. 10 and 11 present the situation, for example, when the reflecting angle of either one or both of prisms 54 and 58 vary. The procedure is essentially the same as that indicated previously except two spots 78 and 80 are involved. Since the prism light reflecting angles are predetermined by using means illustrated in FIG. 5, angles $\alpha$ and $\gamma$ of beams 70 and 72 also become known. Simply, measurement may be effected using spots 78 and 80 when registered into a reference location such as FIG. 11.

Referring to FIGS. 12 and 13, when angle $\beta$ is set to zero, the coincidence of the two light spots 78 and 80 do not occur. However, the apparent distance between the two light spots as viewed in the focal plane of the ocular means 18 varies as the distance of the object 48 from the forward end portion 12 varies. Therefore, the distance D of the object 48 from the forward end portion 12 can be determined on the basis of the distance M between the two light spots 78 and 80 with respect to the field of view of the endoscope, noting FIG. 12. In effect, measurement is achieved by fixing distance M relative to fixed locations of indicators 76 within the field of view.

Thus, in accordance with a feature of the present invention, either one or both of the light reflecting prisms 54 and 58 may be rotated by the operation of the control mechanism of FIG. 5 using knob 19 provided on control housing 14. Either one or both of the light reflecting prisms 54 and 58 may be rendered movable such that either one or both of the light spots formed on the surface of the object 48 may be moved to bring the two light spots into registration with each other, i.e., the FIG. 7 illustration, or into a predetermined relation with respect to the field of view, i.e., the FIG. 10 illustration. The amount of the operation of the control mechanism for bringing the two light spots into registration with each other or into a predetermined relation with respect to the field of view varies according to the distance D between the object 48 and the forward end portion 12. Therefore, the distance D of the object 48 from the forward end portion 12 can be either directly determined or suitable means are included for providing read out of the distance D on the control housing. In the latter case, distance markings 20 may be included relative to knob 19 for direct readings, and operably connected, using the unit of FIG. 4 such to indicate the amount of the rotation thereof in terms of the distance.

It will be apparent from the foregoing that the present device provides great versatility, great efficiency and simplicity of construction affording wide use.

The various elements of the present device may be secured to adjoining elements by any suitable means.

Although a preferred embodiment of the present invention has been illustrated herein, it is to be understood that various changes and modifications may be made in the construction and arrangement of elements without departing from the spirit and scope of the invention as defined.

What is claimed is:

1. In a device for measuring the distance of an object from the forward end portion of an endoscope adapted to be inserted into a hollow portion of a living body or the like for the inspection thereof, said endoscope comprising a control housing, an elongated tube, said control housing being connected to said forward end portion through said elongated tube, an image transmitting optical system extending through said elongated tube and an objective provided in said forward end portion in front of the forward end of said image transmitting optical system, said image transmitting optical system transmitting an image of the object formed on the forward end thereof by said objective lens system the rearward end in said control housing thereby permitting the thus transmitted image to be viewed through ocular means provided in said control housing wherein the improvement comprises, light projecting means for emitting a pair of light beams toward the object from said forward end portion of the endoscope at positions each a certain distance spaced from said objective lens system so as to form two light spots on the surface of the object inspected through the endoscope, thereby permitting the distance of the object from the forward end portion of the endoscope to be determined on the basis of the relative positions of the light spots in the field of view, said light projecting means being comprised of a first and a second fiber optical system being supplied with light from an external light source, the light therefrom being transmitted through a first and a second collimating lens system respectively located in front of the forward end of said fiber optical system, a first and a second prism respectively located in the optical axis of said collimating lens system, said first prism being spaced a certain distance from said second prism, said prisms being positioned opposite to each other with respect to said objective lens system, thereby permitting the reflected light beam to be directed toward the object within the field of view.

2. The device according to claim 1 wherein each of said two light projecting means comprises a fiber optical system extending from said control housing through said elongated tube to said forward end position and adapted to transmit light supplied thereto at the end adjacent to said control housing by an external light source through said fiber optical system to the forward end thereof, a collimating lens system provided in front of the forward end of said fiber optical system, and light reflecting means located in front of said collimating lens system.

3. The device according to claim 1, wherein the improvement comprises deflecting means for deflecting either one or both of said two light beams emitted from said light projecting means and indicating means coupled with said deflecting means so that said indicating means indicates the distance between the object and said forward end portion on the basis of the amount of the operation of said deflecting means so as to bring said two light spots to a predetermined positional relationship in the field of view of the endoscope depending upon the variation in the distance between the object and said forward end portion.

4. The device according to claim 1 comprising a control mechanism provided in said control housing for controlling the direction of at least one of said two light beams and correspondingly the position of said objective lens system so that the direction of the beam is varied by the operation of said control mechanism and correspondingly the field of view so as to bring the light spot formed thereby on the surface of the object into a predetermined relation such as into registration with that formed by the other light beam thereby permitting the distance of the object from the forward end portion of the endoscope to be determined on the basis of the amount of the operation of said control mechanism.

5. The device according to claim 4 wherein the directions of both of said two light beams are adjustable.

* * * * *